United States Patent

[11] 3,615,192

[72] Inventor Kenneth L. Olivier
 Placentia, Calif. 92670
[21] Appl. No. 846,922
[22] Filed Aug. 1, 1969
[45] Patented Oct. 26, 1971
[73] Assignee Union Oil Company of California
 Los Angeles, Calif.

[54] OXIDATION OF HYDROGEN CYANIDE TO CYANOGEN IN A LIQUID MEDIUM UTILIZING A COPPER CATALYST
 5 Claims, No Drawings

[52] U.S. Cl. .................................................. 23/151
[51] Int. Cl. .................................................. C01c 3/00
[50] Field of Search .................................... 23/151

[56] References Cited
UNITED STATES PATENTS
3,494,734   2/1970   Nakamura ................... 23/151
FOREIGN PATENTS
1,163,302   2/1964   Germany ..................... 23/151

Primary Examiner—Oscar R. Vertiz
Assistant Examiner—Hoke S. Miller
Attorneys—Milton W. Lee, Richard C. Hartman, Lannas S. Henderson, Dean Sandford and Robert E. Strauss ABSTRACT: Hydrogen cyanide is oxidized to cyanogen by contacting hydrogen cyanide and oxygen with a substantially anhydrous liquid medium comprising a minor amount of copper at a temperature between 0° C. and about 150° C. and a pressure sufficient to maintain liquid phase conditions.

OXIDATION OF HYDROGEN CYANIDE TO CYANOGEN IN A LIQUID MEDIUM UTILIZING A COPPER CATALYST

DESCRIPTION OF THE INVENTION

The invention relates to the production of cyanogen. In particular, the invention relates to the oxidation of hydrogen cyanide to cyanogen in a liquid phase process conducted at low temperatures.

Various methods of producing cyanogen from hydrogen cyanide have been proposed. The vapor phase oxidation of hydrogen cyanide to cyanogen has been attempted with air over cobalt, palladium or platinum catalysts and with nitrogen dioxide over magnesium or calcium catalysts. These processes have achieved only low selectivities or have consumed stoichiometric quantities of nitrogen dioxide, an expensive oxidant. Attempts to provide simultaneous regeneration of the nitrogen dioxide in the vapor phase have been complicated by the necessity to remove water vapor from the gaseous products and reactants. Liquid phase oxidation with cupric oxide in an aqueous reaction medium has also been attempted, however, the recovery of copper and its regeneration to cupric oxide has involved complex process steps. Another attempt has combined a copper oxidant with nitrogen dioxide, again resulting in consumption of a stoichiometric quantity of nitrogen dioxide.

An object of the invention is to improve the production of cyanogen from hydrogen cyanide.

Another object of the invention is to provide an efficient and relatively uncomplicated process for the oxidation of hydrogen cyanide to cyanogen in a liquid phase process at low temperatures.

A still further object of the invention is to provide a process for the oxidation of hydrogen cyanide to cyanogen without the necessity of a nitrogen dioxide promoter.

Other related objects will be apparent from the description of the invention to follow.

According to the invention, hydrogen cyanide is oxidized to cyanogen by contacting hydrogen cyanide and oxygen with a substantially anhydrous liquid medium containing a catalytic amount of copper at a temperature between 0° and about 150° C., preferably 0° to about 90° C. The reaction proceeds according to the following equation:

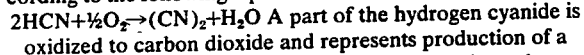

A part of the hydrogen cyanide is oxidized to carbon dioxide and represents production of a wasteful byproduct, however, as will be seen from the examples, the amount of carbon dioxide produced is minimal and the selectivity to cyanogen is high. Another important feature of the invention is that the reaction is not dependent on the presence of a stoichiometric amount of an inorganic nitrogen oxide, e.g., nitrogen dioxide. By product-water produced in the above reaction is advantageously removed and it is preferable that the reaction be conducted under substantially anhydrous conditions, e.g., less than 20 volume percent, preferably less than 10 volume percent water in the reaction medium.

The copper catalyst may be added to the reaction medium as a free metal; oxide; hydroxide; or as a soluble salt such as halide, e.g., chloride, iodide or bromide; sulfate; C1-C20 carboxylate, e.g., acetate, butyrate, valerate, laurate, stearate, etc., or as the salt of any other soluble anion. When the copper is added as a free metal it is, of course, oxidized to cupric oxide by the presence of oxygen in the process. The copper is added in catalytic quantities, e.g., 0.01–5 weight percent, preferably 0.001–1 weight percent of the reaction medium.

The source of oxygen necessary for the reaction may be air, pure oxygen, a mixture of nitrogen and oxygen or any other oxygen-containing gas whose other component(s) are inert to the hydrogen cyanide, cyanogen, the reaction medium, etc. It is preferred that an excess, e.g., 2-100 times the stoichiometric amount required to oxidize hydrogen cyanide of oxygen be present.

The reaction medium may be any organic liquid which has a solvency for the catalyst and for hydrogen cyanide. Suitable media include the carboxylic acids having two to 25 carbons such as the aromatic carboxylic acids, e.g., benzoic acid, toluic, phthalic, naphthoic acids and the fatty acids, e.g., acetic acid, butyric acid, pivalic, caproic, capric, lauric, and stearic acid. Anhydrides of these acids and ketones, esters and amides are also suitable, e.g., acetic anhydride, pivalic anhydride, diethylketone, ethylpropyl ketone, cyclohexanone, ethyl formate, methyl acetate, furfuryl acetate, benzyl benzoate, isobutyramide, etc. The preferred reaction medium is a carboxylic acid, preferably a fatty acid having two to 25 carbons, most preferably two to 12 carbons, e.g., acetic acid, propionic acid, pivalic acid, pentadecanoic acid and/or anhydrides of these acids. Addition of anhydride is advantageous in that byproduct water is absorbed by the anhydride to yield an anhydrous acid solvent. Hence, in one embodiment the reaction may initially contain five to 30, preferably 10 to 30, weight percent of an anhydride of a fatty acid. The reaction medium is preferably substantially anhydrous and anhydrous conditions may be maintained by addition of dehydrating agents such as the aforementioned acid anhydrides, alkyl and aryl isocyanates, alkyl acetals and ketals, in amounts comprising five to 30, preferably 10 to 30, weight percent of the reaction medium. Anhydrous conditions may also be maintained by constant removal of the reaction medium, separation of the water from the reaction medium and recycling the dehydrated reaction medium to the reaction zone.

The reaction may be performed at relatively mild temperatures, e.g., 0–150° C. preferably 0–90° C. and most preferably 0–50° C. At these low-temperatures oxidation of hydrogen cyanide to by product carbon dioxide is minimized and the selectivity of hydrogen cyanide to cyanogen is generally above about 85 mole percent. The lower temperatures also reduce the need for large amounts of heating and cooling facilities and pressures required to maintain liquid phase may be relatively low, e.g., 1 to 8, preferably 1 to 3 atmospheres absolute. Higher pressures, e.g., 1 to 20 atmospheres, however, may be used if desired.

The reaction can be performed batchwise or in a continuous fashion, however, a continuous process is preferred. A liquid phase containing the copper catalyst and the reaction solvent can be introduced into a low-pressure reactor. Hydrogen cyanide (which may be added as a liquid or vapor) and air can be continuously passed into the reactor to contact the reaction medium and catalyst. The effluent gases are continuously taken overhead, transferred to a separator, cooled and water and other condensibles removed as bottoms and transferred to a distillation scheme to be discussed hereinafter. The uncondensibles containing chiefly nitrogen, oxygen, carbon dioxide, hydrogen cyanide and cyanogen are taken overhead and subjected to a washing operation to separate cyanogen and hydrogen cyanide. The overhead gas stream containing nitrogen, oxygen and carbon dioxide may be flared or, depending on the economics, the carbon dioxide may be recovered therefrom. The aqueous mixture of hydrogen cyanide and cyanogen is taken from the bottom of the washing column and transferred to a distillation column where cyanogen and hydrogen cyanide are distilled overhead, transferred to another distillation wherein cyanogen is taken overhead and sent to product storage. Hydrogen cyanide is recycled to the aforementioned reactor for further conversion to cyanogen. The condensibles from the separator just downstream of the reactor are transferred to a distillation column wherein cyanogen and hydrogen cyanide flow overhead with the overhead stream from the aforementioned separator and are subjected to the above described washing operations. The bottoms comprising water in the reaction medium are transferred to a distillation column wherein water is flashed overhead and the reaction medium, which may contain entrained copper, is recycled to the reactor for further contact with hydrogen cyanide and oxygen.

As will be apparent from the examples, the amount of hydrogen cyanide converted to byproduct carbon dioxide is minimal and the selectivity to cyanogen is high even in the absence of a promoter. It may be desired, however, in some processes, to add a promoter to increase the kinetic activity of the catalyst. Such a promoter may be nitrogen dioxide, nitric acid or an nitrate salt such as cupric nitrate, lithium nitrate, sodium nitrate, magnesium nitrate, potassium nitrate, etc., or other promoters known in the art.

EXAMPLE 1

To a 500 milliliter, 3-necked flask were added 250 milliliters acetic acid and 1-gram cupric acetate hydrate. Air at essentially ambient temperature and atmospheric pressure was continuously passed at a rate of 52.5 liters per hour through a hydrogen cyanide liquid reservoir maintained at 0° C. such as to saturate the air stream with hydrogen cyanide. The saturated airstream was continuously passed into the 500-milliliter flask containing the acetic acid and cupric acetate hydrate and an effluent was continuously withdrawn from the flask. The temperature of the reaction medium was maintained at about 27–29° C. throughout the run. A gaseous effluent was continuously removed from the flask and a spot sample of the effluent gas stream taken and analyzed. The effluent gas stream was found to contain 3.76 mole percent hydrogen cyanide, 0.06 percent nitric oxide, 0 percent nitrogen dioxide, 0.21 percent carbon dioxide and 0.88 percent cyanogen, with the balance comprising principally nitrogen, oxygen and water. After adjustment for carbon dioxide introduced in the feed air, the selectivity, based on hydrogen cyanide converted, was calculated to be about 90 mole percent, conversion to all products based on hydrogen cyanide 31 mole percent and yield of cyanogen based on hydrogen cyanide converted 28 mole percent.

I claim:

1. The oxidation of hydrogen cyanide to cyanogen which comprises contacting hydrogen cyanide and oxygen with substantially anhydrous acetic acid containing less than 10 weight percent water in the presence of a copper catalyst at a temperature between 0 and 150° C. and at a pressure sufficient to maintain liquid phase reaction conditions.

2. The method of claim 1 wherein the reaction is conducted at 0°–50° C.

3. The oxidation of claim 1 wherein said acetic acid is entirely anhydrous.

4. The oxidation of claim 3 wherein said acetic acid also contains from 5 to 30 weight percent acetic anhydride.

5. The oxidation of claim 1 wherein said anhydrous acetic acid also contains nitric acid.